United States Patent [19]
Goto

[11] Patent Number: 5,745,851
[45] Date of Patent: Apr. 28, 1998

[54] APPARATUS AND METHOD FOR MESSAGE RECORDING AND RECEIPT-OF-MESSAGE NOTIFICATION TO CORDLESS STATION OPERATING AS CELLULAR TELEPHONE

[75] Inventor: Masataka Goto, Tokyo, Japan

[73] Assignee: Nec Corporation, Tokyo, Japan

[21] Appl. No.: 588,318

[22] Filed: Jan. 18, 1996

[30] Foreign Application Priority Data

Jan. 26, 1995 [JP] Japan .................. 7-028936

[51] Int. Cl.⁶ .................. H04Q 7/20; H04Q 7/22
[52] U.S. Cl. .................. 455/432; 455/412; 455/426; 455/553; 379/89
[58] Field of Search .................. 455/412, 413, 455/414, 415, 432, 445, 552, 553, 458, 567; 379/87, 88, 89

[56] References Cited

U.S. PATENT DOCUMENTS

| | | | |
|---|---|---|---|
| 4,677,655 | 6/1987 | Hashimoto | 455/412 |
| 4,942,598 | 7/1990 | Davis | 455/412 |
| 5,177,780 | 1/1993 | Kasper et al. | 455/412 |
| 5,367,558 | 11/1994 | Gillig et al. | 455/414 |
| 5,502,761 | 3/1996 | Duncan et al. | 455/412 |
| 5,574,771 | 11/1996 | Driessen et al. | 455/413 |
| 5,592,532 | 1/1997 | Koizumi | 455/412 |
| 5,625,884 | 4/1997 | Gitlin et al. | 455/458 |

FOREIGN PATENT DOCUMENTS

| | | |
|---|---|---|
| 0481683 | 4/1992 | European Pat. Off. |
| 0503813 | 9/1992 | European Pat. Off. |

*Primary Examiner*—Dwayne Bost
*Assistant Examiner*—Nay Maung
*Attorney, Agent, or Firm*—Sughrue, Mion, Zinn, Macpeak & Seas, PLLC

[57] ABSTRACT

A cordless station is operable in a local mode when it is in a local area and in a global mode when it is outside of the local area. The cordless station is assigned a telephone number of a cellular mobile telephone network (CMTN) for establishing a connection therewith when it is operating in the global mode. A memory is provided for storing the cellular telephone number. A controller is connected to a public switched telephone network (PSTN) to receive an incoming call and forwards it to the cordless station when the latter is operating in the local mode, and operates a telephone answering unit to record a message of the call if the cordless station is operating in the global mode. When a message is recorded, the controller originates a call to the PSTN using the telephone number stored in the memory to establish a connection through the PSTN and CMTN networks to the cordless station operating in the global mode. A prerecorded announcement is then sent to the cordless station via the established connection indicating that a message has been recorded in the telephone answering unit. Preferably, the controller then operates the telephone answering unit to reproduce the recorded message and transmits it to the cordless station.

12 Claims, 4 Drawing Sheets

BASE UNIT 1
(MAIN STATION)

CORDLESS STATION 2

AUTOMATIC CALL FORWARDING

APPARATUS AND METHOD FOR MESSAGE RECORDING AND RECEIPT-OF-MESSAGE NOTIFICATION TO CORDLESS STATION OPERATING AS CELLULAR TELEPHONE

BACKGROUND OF THE INVENTION

1. Field of the Invention

The present invention relates generally to cordless telephone systems, and more particularly to a cordless telephone system wherein the cordless station operates in a local mode in which it communicates via the main station with a public switched telephone network and in a global mode in which it establishes communication with a cellular mobile telephone network.

2. Description of the Related Art Known cordless telephone systems include a main station and one or more cordless stations where the cordless station can access the public switched telephone network via the base unit or main station. In a recently developed cordless telephone system, each cordless station is provided with a global mode switch. When this switch is not operated, the cordless station operates in a local mode in which it establishes an intercom channel to the base unit to communicate with the public switched telephone network. When this switch is operated, the cordless station operates in a global mode in which it establishes a radio link to a nearby cell-site station of a cellular mobile telephone network. For the cordless station to operate in the global mode, a telephone number of the cellular mobile telephone network is assigned. The cordless telephone system is further provided with a telephone answering unit to record a voice message of a caller if the cordless station is operating outside of the local area in the global mode.

However, if an urgent message is received, it is likely to be left unnoticed for an extended period of time. If this situation is to be avoided, cordless station users must make frequent calls from a remote location to gain access to a message recorded in the telephone answering unit.

SUMMARY OF THE INVENTION

It is therefore an object of the present invention to provide an apparatus and method for recording a message and notification of receipt of the message to a cordless station when operating as a cellular telephone.

According to a broader as aspect, the present invention provides an apparatus which comprises a cordless station operable in a local mode when the cordless station is in a local area and in a global mode when the cordless station is outside of the local area, the cordless station being assigned a cellular telephone number of a cellular mobile telephone network for establishing a connection with the cellular mobile telephone network when the cordless station is operating in the global mode. A memory is provided for storing the cellular telephone number. The apparatus includes a telephone answering unit for recording a message in a recording mode and reproducing the recorded message in a playback mode. A controller is connected to a public switched telephone network or receiving an incoming call therefrom. The controller forwards the call to the cordless station when the cordless station is operating in the local mode, and operates the telephone answering unit to record a message of a call if the call is received during the period the telephone answering unit is set in the recording mode, and originates a call to the public switched telephone network using the cellular telephone number stored in the memory to establish a connection through the networks to the cordless station operating in the global mode. A prerecorded announcement is then sent to the cordless station operating in the global mode via the established connection indicating that a message has been recorded in the telephone answering unit.

In a preferred embodiment, the controller operates the telephone answering unit in the playback mode to reproduce the recorded message and transmits the reproduced message to the cordless station via the established connection after the prerecorded announcement is transmitted.

According to a further aspect, the present invention provides a method for operating a cordless telephone system, wherein the system has a cordless station operable in a local mode when the cordless station is in a local area and in a global mode when the cordless station is outside of the local area, the cordless station being assigned a cellular telephone number of a cellular mobile telephone network for establishing a connection with the cellular mobile telephone network when the cordless station is operating in the global mode, and a telephone answering unit for recording a message in a recording mode and reproducing the recorded message in a playback mode. According to the method, the cellular telephone number of the cordless station is stored in a memory, and the telephone answering unit is set in the recording mode when the cordless station is operating in the global mode, receiving an incoming call from a public switched telephone network, operating the telephone answering unit to record a message of the incoming call, originating a call to the public switched telephone network using the cellular telephone number stored in the memory to establish a connection through the networks to the cordless station operating in the global mode, and transmitting a prerecorded announcement to the cordless station via the established connection indicating that a message has been recorded in the telephone answering unit. The method preferably comprises the step of operating the telephone answering unit in the playback mode to reproduce the recorded message and transmitting the reproduced message to the cordless station via the established connection after the prerecorded announcement is transmitted.

BRIEF DESCRIPTION OF THE DRAWING

The present invention will be described in further detail with reference to the accompanying drawings, in which.

DETAILED DESCRIPTION

Figure 1:
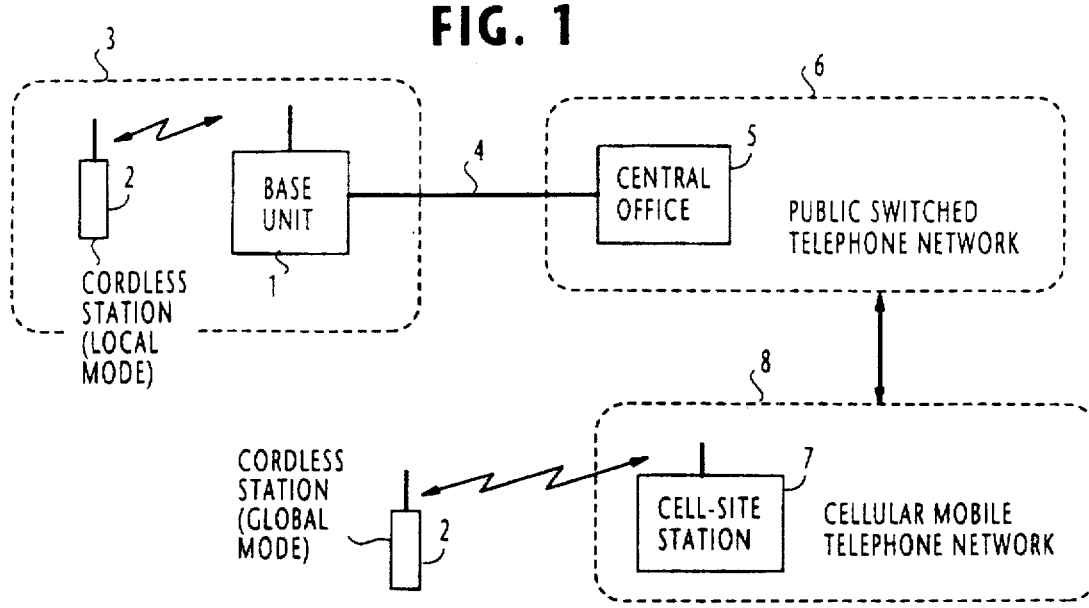
FIG. 1 is a schematic block diagram of a cordless telephone system of the present invention, illustrating a cordless station operating in a cellular network mode and a cellular network mode.

As illustrated in FIG. 1, a cordless telephone system of the present invention includes a base unit 1 and a cordless station 2. Cordless station 2 is normally located in a local area, or home 3 with the base unit and is operable in local mode to interact via the base unit and via a telephone line (subscriber loop) 4 with a switching office 5 of a public switched telephone network 6. Cordless station 2 can be moved outside of the local area and is operable in global mode as a personal cellular telephone to interact with a cell-site base station 7 of a cellular mobile telephone network 8, such as the Japanese PHS (Personal Handy-phone System) system. For the cordless station to operate in the global mode, it is assigned a telephone number of the cellular network 8.

Figure 2:
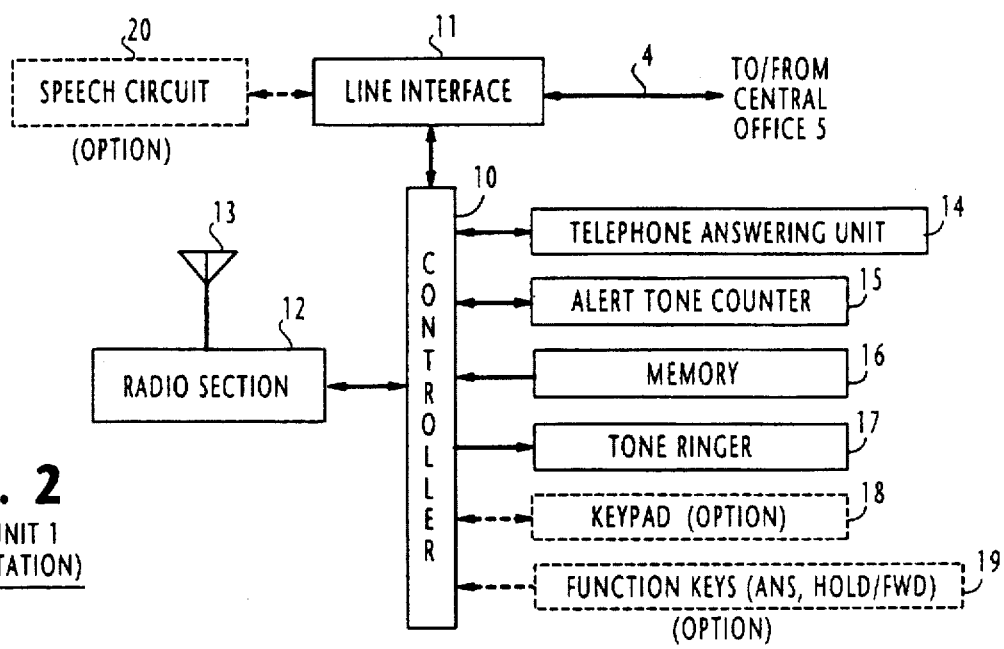
FIG. 2 is a block diagram of a main station incorporating embodiments of the present invention.

In FIG. 2, the base unit includes a controller 10 and a line interface 11 by way of which the controller 10 is connected to the subscriber loop 4. To the controller is connected a radio section 12 which establishes a radio channel to the cordless station through antenna 13. Base unit 1 additionally includes a telephone answering unit 14, an alert tone counter 15, a memory 16 and a tone ringer 17, all of which are connected to controller 1.

Telephone answering unit 14 is of a conventional design which, when set to recording mode, produces a prerecorded announcement on receiving a call, indicating the absence of the cordless station user, and then records a message of a caller, and when set to playback mode, produces a prerecorded announcement indicating the presence or absence of a recorded message and then reproduces a recorded message if present. Alert tone counter 15 is operated when the telephone answering unit 14 is set in the recording mode to count the number of alert tones (hence, ring-back tones to the caller) and produces an output when the alert tone is repeated a predetermined number of times. The output of counter 15 is used by the controller to start operating the telephone answering unit in the recording mode.

In the memory 16 is stored the telephone number of the cellular mobile network 8 assigned to the cordless station 2 when operating in the global mode. As will be described, the controller 10 uses the stored telephone number to initiate a call to the PSTN to establish a connection through the PSTN and CMTN networks 6 and 8 to the cordless station operating in the global mode to inform of its user of the presence of a recorded message.

As an option, base unit 1 is modified into a form which can be used as a master telephone. In this case, the master telephone is a main station which controls the cordless station in a master-slave relationship, and additionally includes a keypad 18, function keys arrangement 19 including answer-mode key and hold/forward key and so forth, and a speed circuit 20 of a handset.

Figure 3:
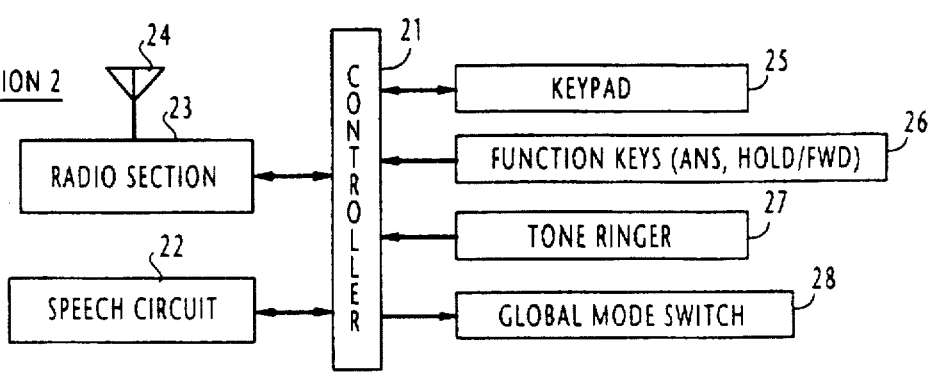
FIG. 3 is a block diagram of a cordless station of the present invention.

In FIG. 3, cordless station 2 has a controller 21 to which speech circuit 22, radio section 23, keypad 25, function keys 26, tone ringer 27 and a global mode switch 28. Radio section 23 establishes a radio channel with the main station 1 through antenna 24. When the cordless station is outside of the local area 3, the global mode switch 28 is operated to set the cordless station in the global mode.

Figure 4:
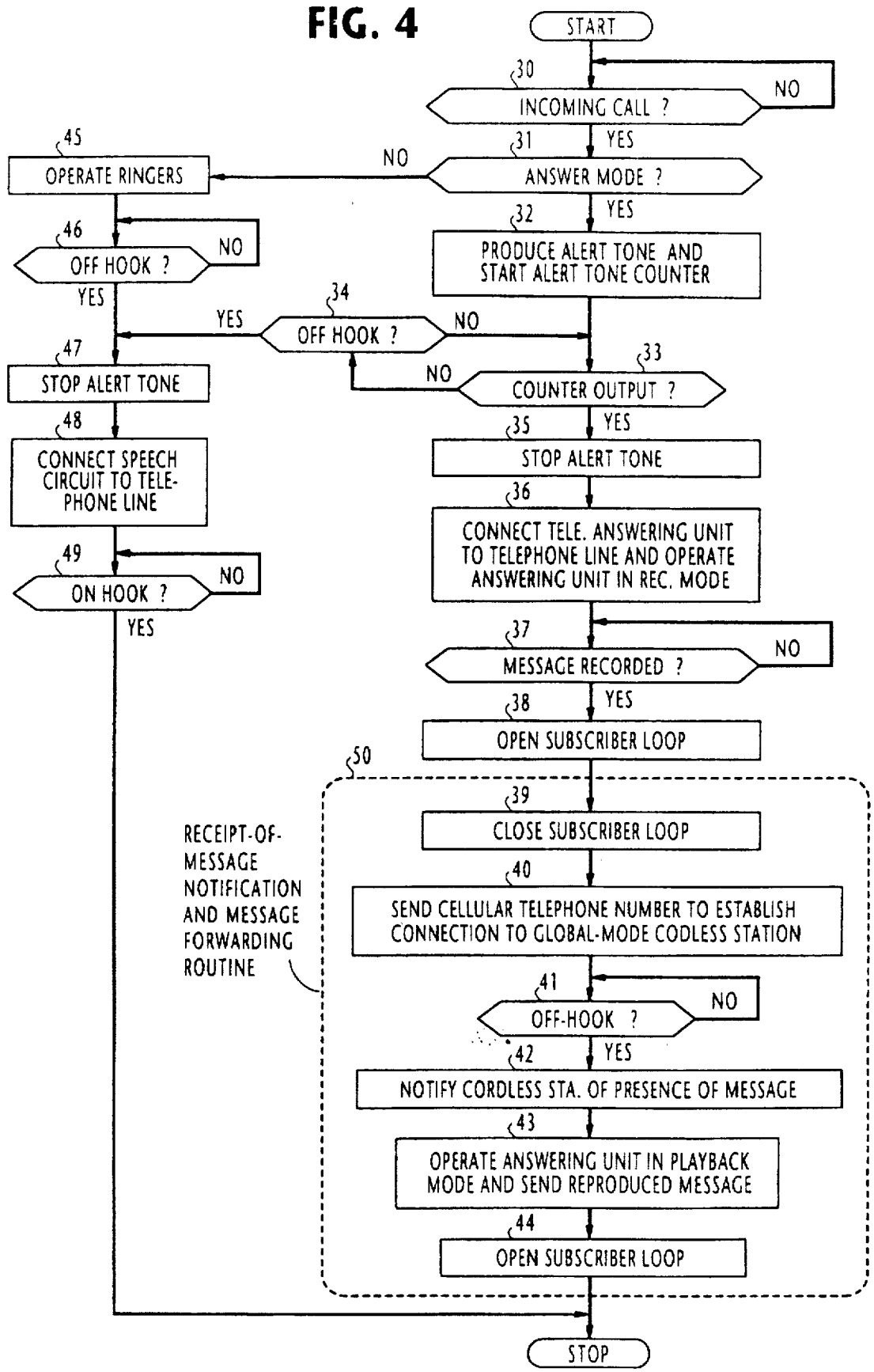
FIG. 4 is a flowchart illustrating a programmed operation performed by a base unit according to a first embodiment of the present invention.

The operation of the base unit 1 is illustrated in the flowchart of FIG. 4 when the telephone answering unit 14 is set in the recording mode by operating the answer-mode key at the base unit or cordless station and the cordless station is set in the global mode by operating its global mode switch 28 when it is taken outside of the local area. Program execution of the base unit 1 starts with decision block 30 that determines whether there is an incoming call from the PSTN 6. If a call is received from the PSTN, flow proceeds to block 31 where the base unit determines whether the system is set in an automatic answer mode. If the telephone answering unit 14 is already set in the recording mode, the decision at block 31 is affirmative and flow proceeds from block 31 to block 32 to produce alert tones and start operating the alert tone counter 17. Exit then is to decision block 33 where the base unit checks to see if the alert tone counter 33 has counted a predetermined number of alert tones and produced its output. As long as the decision at block 33 is negative, flow proceeds to block 34 to determine whether the cordless station goes off hook. If the answering unit 14 is inadvertently set in the recording mode, the user will be alerted by the alert tone and answer the call, so that an off-hook condition is detected at block 34 and the alert tone is stopped block 47). The speech circuit 22 of the cordless station is then connected via a radio channel to the telephone line 4 (block 48). At the end of the call, an on-hook condition is detected at block 49.

If the system is nor in the automatic answer mode, the decision at block 31 is negative and flow proceeds from block 31 to block 45 where the base unit activates all tone ringers to alert the user of the arrival of a call. If the cordless station goes off hook, the off-hook condition is detected at block 46 and flow proceeds to block 47.

On the other hand, with the system being set in the answering mode, the decision at block 34 is normally negative, and the alert tone counter 15 produces an output signal. As a result, flow proceeds from block 33 to block 35 to stop the alert tone. The incoming call is answered by closing subscriber loop 4 at block 36. This is done by connecting the answering unit 14 to the telephone line 4 and activating the answering unit 14 in the recording mode. Thus, a prerecorded announcement is sent to the telephone line to urge the caller at the distant end of the line to leave a message following a beep tone and a caller's message is recorded. When the message is recorded (block 37), flow proceeds to block 38 to open the subscriber loop 4 to clear the connection in the PSTN.

Figure 5:
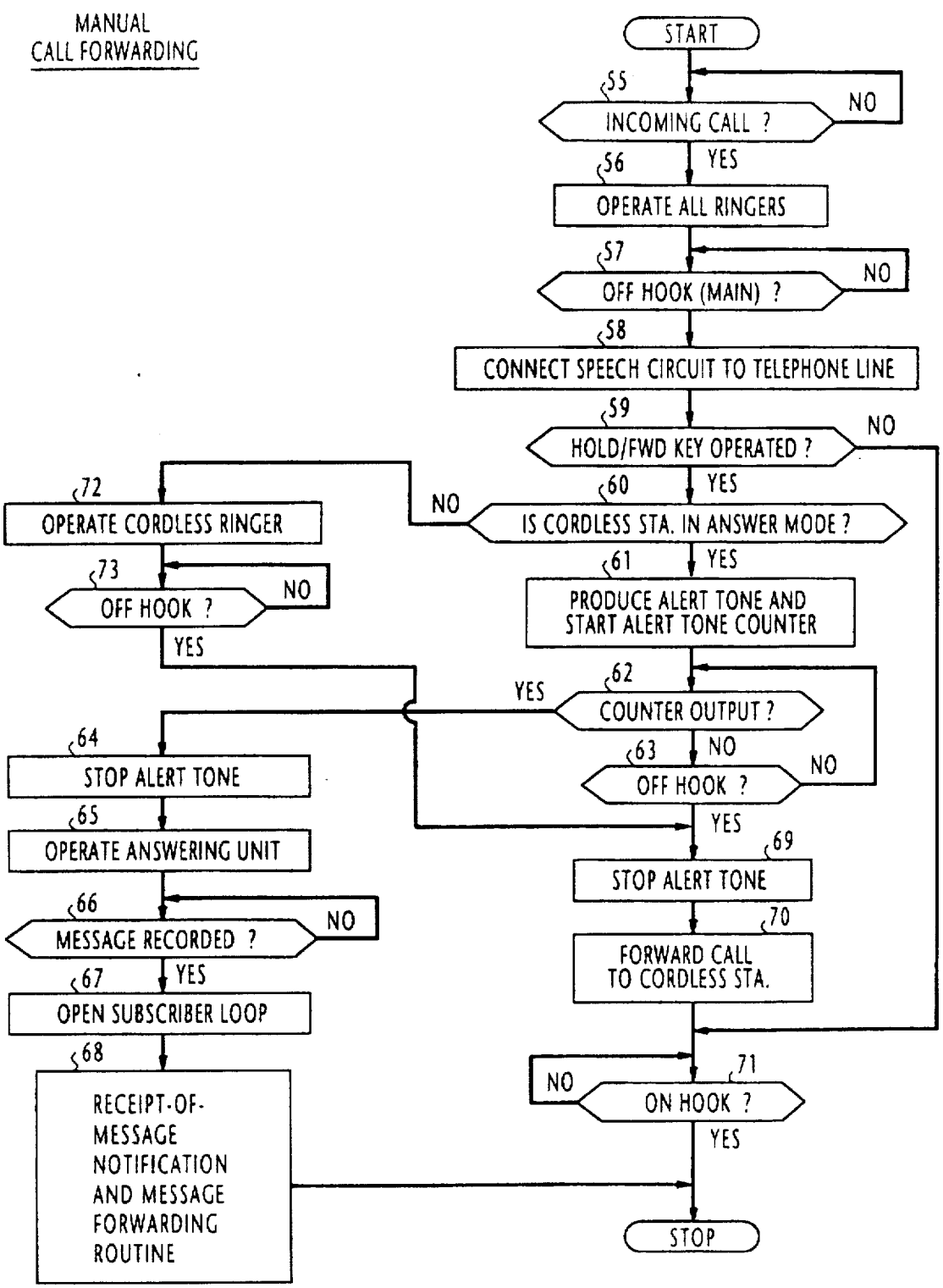
FIG. 5 is a flowchart illustrating a programmed operation performed by a main station according to a second embodiment of the present invention.

With the connection with the caller of the message being cleared, flow proceeds from block 38 to receipt-of-message notification and message forwarding routine 50. Routine 50 begins with block 39 where the base unit forms a dc-loop by closing the subscriber loop 4 to receive dial tone from the switching office 5. At block 40, base unit 1 reads the stored cellular telephone number from memory 16 and sends it to the PSTN to establish a connection through PSTN 6 and CMTN 8 to the cordless station operating in the global mode. Therefore, the global-mode cordless station is alerted. If it goes off hook (block 41), flow proceeds to block 42 where the base unit gives a prerecorded announcement notifying the cordless station user of the presence of a recorded message. Preferably, flow proceeds to block 43 where the base unit operates the answering unit 14 in playback mode to reproduce the recorded message and sends it to the cordless station over the established connection. At the end of transmission of the caller's recorded message, flow proceeds to block 44 to open the subscriber loop 4 to clear the connection to the cordless station FIG. 5 illustrates a programmed sequence of operations to be performed by the base unit when it is used as a main station (which is provided with the optional elements of FIG. 2) in a master-slave relationship with the cordless station and the answering unit 14 can be set individually in the recording mode by the main and cordless stations. If the answering unit 14 is set in the recording mode by the cordless station, for example, it is only the message of the call destined to it can be recorded and it is only the cordless station that can access the recorded message. In FIG. 5, call forwarding from the main station to the cordless station is manually performed. Program execution starts with block 55 to detect an incoming call from PSTN 6. When a call is received, all tone ringers are activated (block 56). If the main station goes off hook (block 57), the subscriber loop is closed by connecting to it the speech circuit of the main station (block 58. If the call is destined to the cordless station 2, the hold/forward key at the main station is operated to keep the calling party in a line-hold condition (block 59). If this is the case, flow proceeds from block 59 to block 60 to check to see if the cordless station has been set in an automatic answering mode. If the call is destined to the main station, the hold/forward key is nor operated (block 59) and flow proceeds from block 59 to block 71 to determine when it goes on hook and flow proceeds to the end of the program.

If the cordless station is determined to be set in the answering mode (block 60), flow proceeds to block 61 where the main station produces an alert tone and starts the alert tone counter 15. Flow proceeds to block 62 to check for an output of the alert tone counter. If there is none, flow proceeds to block 63 to check for an off-hook condition of the cordless station.

If the cordless station is inadvertently set in automatic answer mode, the user will be alerted and an off hook condition wilt occur (block 63) and the alert tone is stopped (block 69). The incoming call will be forwarded from the main station to the cordless station (block 70), and flow proceeds to block 71. If the cordless station is not set in the automatic answer mode (block 60), the tone ringer of the cordless station is operated (block 72) and if the cordless station goes off hook (block 73), flow proceeds to block 69.

Since the cordless station is assumed to be set in the automatic answering mode, the alert tone counter 15 produces an output and flow proceeds from block 62 to block 64 to stop the alert tone. Answering unit 14 is then operated (block 65) and when the caller's message is recorded (block 66), flow proceeds to block 67 to open the subscriber loop 4 to clear the connection. Flow proceeds to receipt-of-message notification and message forwarding routine 68 in the same manner as is performed by routine 50 of FIG. 4.

Figure 6:
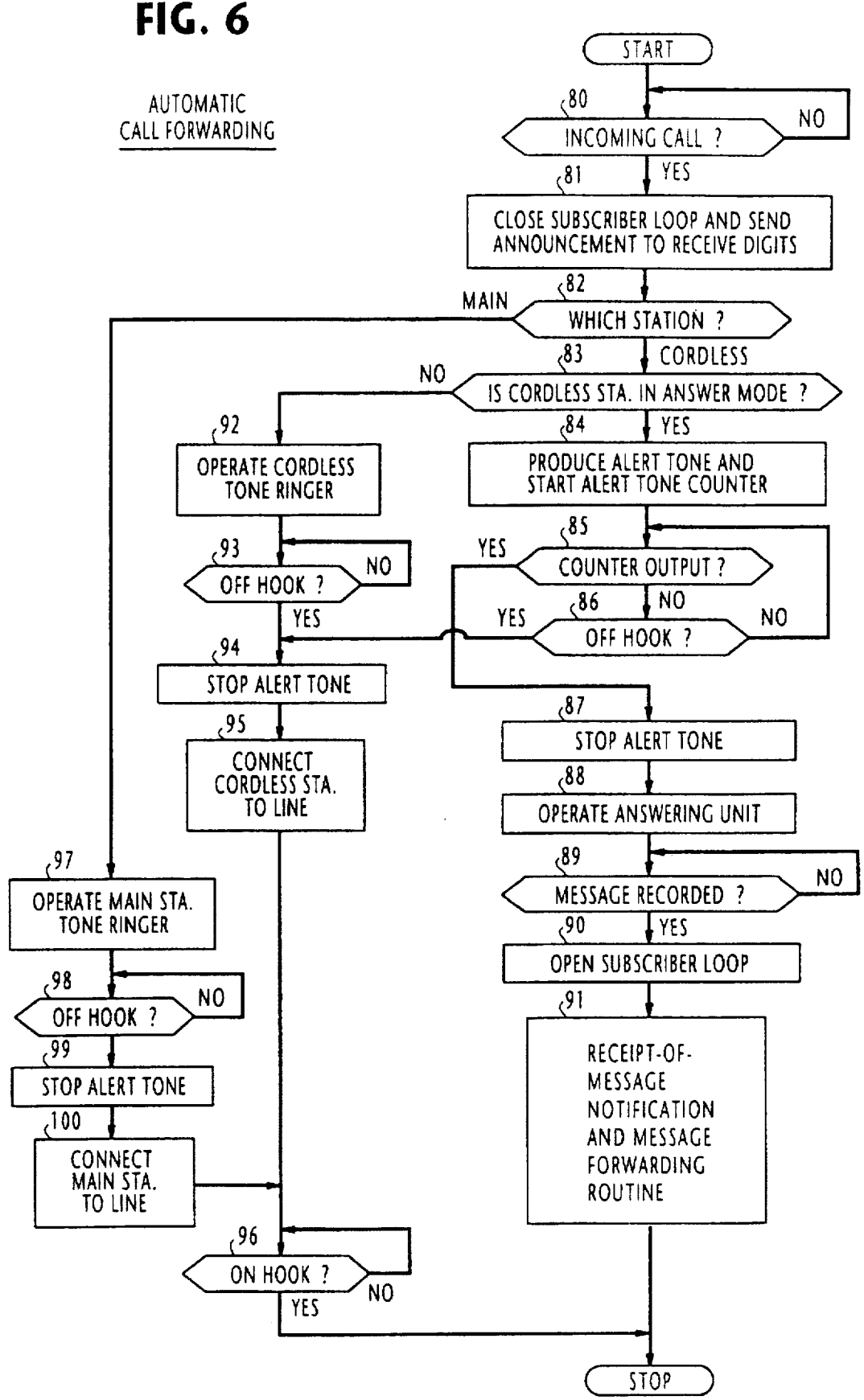
FIG. 6 is a flowchart illustrating a programmed operation performed by the main station according to a third embodiment of the present invention.

FIG. 6 illustrates a modified mode of the programmed sequence performed by the main station, where the main station discriminates individual calls and automatically forwards them to appropriate destination stations. Program execution starts with block 80 to detect an incoming call from PSTN 6. When a call is received, the controller 10 forms a dc-loop on the telephone line and sends an announcement that the called party is being alerted (block 81). During the time the announcement is being given, the caller sends specified digits, which are decoded by the main station and the destination station is identified (block 82). If the cordless station is identified as the destination, flow proceeds from block 82 to block 83 to determine whether the cordless station is set in automatic answer mode. If this is the case, alert tone is produced and alert tone counter 15 is started to count the alert tone (block 84). When the predetermined number of alert tones is counted (block 85) before the occurrence of an off-hook condition (block 86), the alert tone is stopped (block 87) and the answering unit 14 is operated (block 88) to record the caller's message (block 89), which is followed by the opening of the subscriber loop 4 (block 90).

As in the previous embodiments, receipt-of-message notification and message forwarding routine 91 is performed following the execution of block 90.

If the cordless station is not set in the answering mode, flow proceeds from block 83 to block 92 to operate the cordless tone ringer 27. If the cordless station goes off hook (block 93), the alert tone is stopped (block 94) and the cordless station speech circuit 22 is connected to the telephone line 4 (block 95) to aglow conversation to begin. Flow proceeds to block 96 to detect the end of the conversation. If the main station is identified as the destination (block 82), flow proceeds to block 97 to operate the main station tone ringer 17. If the main station goes off hook (block 98), the alert tone is stopped (block 99) and the main station speech circuit 20 is connected to the telephone line 4 (block 100) to allow conversation to begin. Flow proceeds to block 96 to detect the end of the conversation.

What is claimed is:

1. An apparatus comprising:
    a cordless station operable in a local mode when the cordless station is in a local area and in a global mode when the cordless station is outside of the local area, the cordless station being assigned a cellular telephone number of a cellular mobile telephone network for establishing a connection with the cellular mobile telephone network when the cordless station is operating in the global mode;
    a memory for storing the cellular telephone number;
    a telephone answering unit for recording a message in a recording mode and reproducing the recorded message in a playback mode;
    means for setting the telephone answering unit in the recording mode; and
    a controller connected to a public switched telephone network for receiving an incoming call therefrom, forwarding the call to the cordless station when the cordless station is operating in the local mode, operating the telephone answering unit to record a message of a call if the call is received during the period the telephone answering unit is set in the recording mode, originating a call to the public switched telephone network using the cellular telephone number stored in the memory to establish a connection through said networks to the cordless station operating in the global mode, and transmitting a prerecorded announcement to the cordless station via the established connection indicating that a message has been recorded in said telephone answering unit.

2. An apparatus as claimed in claim 1, wherein said controller includes means for operating the telephone answering unit in the playback mode to reproduce the recorded message and transmitting the reproduced message to the cordless station via the established connection after transmission of said prerecorded announcement.

3. An apparatus comprising:
    a main station having a hold/forward key arranged to be manually operated when a call is received;
    a cordless station operable in a local mode when the cordless station is in a local area and in a global mode when the cordless station is outside of the local area, said cordless station being assigned a cellular telephone number of a cellular mobile telephone network for establishing a connection with the cellular mobile telephone network when the cordless station is operating in the global mode;
    a memory for storing said cellular telephone number;
    a telephone answering unit for recording a message in a recording mode and reproducing the recorded message in a playback mode;
    means for setting the telephone answering unit in the recording mode; and a controller connected to a public switched telephone network for receiving an incoming call therefrom, forwarding the call from said main station to said cordless station when said hold/forward key is operated and said cordless station is operating in the local mode, operating the telephone answering unit to record a message of a call if the call is received during the period the telephone answering unit is set in the recording mode, originating a call to the public switched telephone network using the cellular telephone number stored in the memory to establish a connection through said networks to the cordless station operating in the global mode, and transmitting a prerecorded announcement to the cordless station via the established connection indicating that a message has been recorded in said telephone answering unit.

4. An apparatus as claimed in claim 2 wherein said controller includes means for operating the telephone answering unit in the playback mode to reproduce the recorded message and transmitting the reproduced message to the cordless station via the established connection after transmission of said prerecorded announcement.

5. An apparatus comprising:

a main station;

a cordless station operable in a local mode when the cordless station is in a local area and in a global mode wherein the cordless station is outside of the local area, said cordless station being assigned a cellular telephone number of a cellular mobile telephone network for establishing a connection with the cellular mobile telephone network when the cordless station is operating in the global mode;

a memory for storing said cellular telephone number;

a telephone answering unit for recording a message in a recording mode and reproducing the recorded message in a playback mode;

means for setting the telephone answering unit in the recording mode; and a controller connected to a public switched telephone network for receiving an incoming call therefrom, producing an announcement upon receipt of the incoming call and identifying one of said main station and said cordless station as a destination depending on digits received during the period said announcement is produced, forwarding the call to said cordless station when said cordless station is identified as the destination and said cordless station is operating in the local mode, operating the telephone answering unit to record a message of a call if the call is received during the period the telephone answering unit is set in the recording mode and if the cordless station is identified as said destination, originating a call to the public switched telephone network using the cellular telephone number stored in the memory to establish a connection through said networks to the cordless station operating in the global mode, and transmitting a prerecorded announcement to the cordless station via the established connection indicating that a message has been recorded in said telephone answering unit.

6. An apparatus as claimed in claim 5, wherein said controller includes means for operating the telephone answering unit in the playback mode to reproduce the recorded message and transmitting the reproduced message to the cordless station via the established connection after transmission of said prerecorded announcement.

7. A method for operating a cordless telephone system comprising a cordless station operable in a local mode when the cordless station is in a local area and in a global mode when the cordless station is outside of the local area, said cordless station being assigned a cellular telephone number of a cellular mobile telephone network for establishing a connection with the cellular mobile telephone network when the cordless station is operating in the global mode, and a telephone answering unit for recording a message in a recording mode and reproducing the recorded message in a playback mode, the method comprising the steps of:

storing said cellular telephone number in a memory;

setting the telephone answering unit in the recording mode when the cordless station is operating in the global mode;

receiving an incoming call from a public switched telephone network;

operating the telephone answering unit to record a message of said incoming call;

originating a call to the public switched telephone network using the cellular telephone number stored in the memory to establish a connection through said networks to the cordless station operating in the global mode; and transmitting a prerecorded announcement to the cordless station via the established connection indicating that a message has been recorded in said telephone answering unit.

8. A method as claimed in claim 7, further comprising the step of operating the telephone answering unit in the playback mode to reproduce the recorded message and transmitting the reproduced message to the cordless station via the established connection after said prerecorded announcement is transmitted.

9. A method for operating a cordless telephone system comprising a main station having a hold/forward key arranged to be manually operated when a call is received, a cordless station operable in a local mode when the cordless station is in a local area and in a global mode when the cordless station is outside of the local area, said cordless station being assigned a cellular telephone number of a cellular mobile telephone network for establishing a connection with the cellular mobile telephone network when the cordless station is operating in the global mode, and a telephone answering unit for recording a message in a recording mode and reproducing the recorded message in a playback mode, the method comprising the steps of storing said cellular telephone number in a memory;

setting the telephone answering unit in the recording mode;

receiving an incoming call from a public switched telephone network;

operating the telephone answering unit to record a message of the incoming call when said hold/forward key is operated;

originating a call to the public switched telephone network using the cellular telephone number stored in the memory to establish a connection through said networks to the cordless station operating in the global mode; and transmitting a prerecorded announcement to the cordless station via the established connection indicating that message has been recorded in said telephone answering unit.

10. A method as claimed in claim 9, further comprising the step of operating the telephone answering unit in the playback mode to reproduce t he recorded message and transmitting the reproduced message to the cordless station via the established connection after said prerecorded announcement is transmitted.

11. A method for operating a cordless telephone system comprising a main station, a cordless station operable in a local mode when the cordless station is in a local area and in a global mode when the cordless station is outside of the local area, said cordless station being assigned a cellular telephone number of a cellular mobile telephone network for establishing a connection with the cellular mobile telephone network when the cordless station is operating in the global mode, and a telephone answering unit for recording a message in a recording mode and reproducing the recorded message in a playback mode, the method comprising the steps of:

storing said cellular telephone number in a memory;

setting the telephone answering unit in the recording mode; and receiving an incoming call from a public switched telephone network;

sending an announcement to the public switched telephone network and identifying one of said main station and said cordless station as a destination depending on digits received during the period said announcement is sent;

operating the telephone answering unit to record a message of said incoming call when said cordless station is identified as said destination;

originating a call to the public switched telephone network using the cellular telephone number stored in the memory to establish a connection through said networks to the cordless station operating in the global mode; and transmitting a prerecorded announcement to the cordless station via the established connection indicating that a message has been recorded in said telephone answering unit.

12. A method as claimed in claim 11, further comprising the step of operating the telephone answering unit in the playback mode to reproduce the recorded message and transmitting the reproduced message to the cordless station via the established connection after said prerecorded announcement is transmitted.

* * * * *

UNITED STATES PATENT AND TRADEMARK OFFICE
CERTIFICATE OF CORRECTION

PATENT NO. : 5,745,851
DATED : April 28, 1998
INVENTOR(S) : Masataka GOTO

It is certified that error appears in the above-identified patent and that said Letters Patent is hereby corrected as shown below:

Title page item [73],

Assignee, change "Nec Corporation" to --NEC Corporation--.

Signed and Sealed this

Fourth Day of May, 1999

Attest:

Q. TODD DICKINSON

*Attesting Officer*     Acting Commissioner of Patents and Trademarks